Patented Aug. 14, 1923.

1,464,506

UNITED STATES PATENT OFFICE.

JAMES S. GROFF, OF NEWPORT, RHODE ISLAND.

ELECTROLYTIC PROCESS.

No Drawing. Original application filed August 18, 1920, Serial No. 404,475. Divided and this application filed November 16, 1921. Serial No. 515,576.

*To all whom it may concern:*

Be it known that I, JAMES S. GROFF, citizen of the United States, residing at Newport, in the county of Newport and State of Rhode Island, have invented certain new and useful Improvements in Electrolytic Processes, of which the following is a specification.

This invention which is a division of the process disclosed in my Patent No. 1,364,051, December 28, 1920, relates to plating and particularly to the depositing from an electrolyte of solder as a coating or skin on metal vessels or other objects subjected by their usage to rust or corrosion.

The difficulty heretofore with electrolytically depositing more than one metal at the same time has been in the tendency of the metal constituents to separate and deposit in layers instead of in characteristic combination as in the case of solder. In accordance with my invention, however, I am able to deposit solder without separation and with the same successful results as accomplished in depositing lead. Preferably the solder is an alloy of lead and tin. I am, therefore, able to line or coat extensive surfaces with a smooth fine solder skin.

My electrolyte is preferably of high free acidity as this affects a more firmly deposited coating. Good results seem to be secured between 8% and 16% high free hydrofluosilicic acid but as stated in my prior patent better results are obtained by use of a fluoborate solution.

The electrolyte is started as a lead fluosilicate solution which I build up from white lead and hydrofluosilicic acid. The first deposit with such an electrolyte will be pure lead, but as the anode is drawn upon, the electrolyte builds up with the alloy and the deposit on the cathode gradually increases in tin until finally the deposit is a solder deposit similar to the proportions in the anode. This seems to be advantageous both from the view point of economy and in the firmness of the deposit.

I am able to vary percentage of solder or alloy from three percent up and the percentage of free hydrofluosilicic acid may also be varied. The forms in which my invention may be practiced are also variable but within the limits of the appended claims, are to be understood as within the scope of my invention.

What I claim is:—

1. The method of lining a torpedo flask or the like, consisting in gradually electrolytically depositing on it as a cathode a thin dense leaden coating internally thereof from an electrolyte from a lead salt of hydrofluosilicic acid contained within the flask.

2. The method of coating a metallic body, consisting in gradually electrolytically depositing on it as a cathode a dense leaden skin from an electrolyte consisting of a lead salt of hydrofluosilicic acid.

3. The method of lining a torpedo flask or the like, consisting in gradually electrolytically depositing on it as a cathode a progressive increasing alloy of lead and tin as a dense coating from an electrolyte progressively built up from a lead salt of hydrofluosilicic acid and a solder anode.

4. The method of coating a metallic body consisting in gradually electrolytically depositing on it as a cathode, a solder skin from an electrolyte consisting of a lead tin salt of hydrofluosilicic acid.

5. The method of coating a metallic body consisting in gradually electrolytically depositing on it as a cathode a solder skin from an electrolyte consisting of a lead salt of hydrofluosilicic acid and a solder anode suspended therein.

6. The method of coating a metallic body consisting in connecting it electrolytically as a cathode with a solder anode in an electrolyte initially consisting of a lead salt of hydrofluosilicic acid.

In testimony whereof I affix my signature.

JAMES S. GROFF.